United States Patent
Cole et al.

(10) Patent No.: US 12,046,844 B2
(45) Date of Patent: Jul. 23, 2024

(54) LIQUID-COOLED CHARGING SYSTEM FOR A VEHICLE

(71) Applicant: Yazaki North America, Inc., Canton, MI (US)

(72) Inventors: Bryan Donald Cole, Whitmore Lake, MI (US); Max Daniel McVety, Ann Arbor, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 17/962,873

(22) Filed: Oct. 10, 2022

(65) Prior Publication Data

US 2023/0031719 A1  Feb. 2, 2023

Related U.S. Application Data

(63) Continuation of application No. 16/517,031, filed on Jul. 19, 2019, now Pat. No. 11,469,531.

(51) Int. Cl.
| | |
|---|---|
| *H02J 7/00* | (2006.01) |
| *H01R 13/00* | (2006.01) |
| *H01R 13/52* | (2006.01) |
| *H01R 13/73* | (2006.01) |

(52) U.S. Cl.
CPC ....... *H01R 13/005* (2013.01); *H01R 13/5219* (2013.01); *H01R 13/73* (2013.01); *H02J 7/0042* (2013.01); *H01R 2201/26* (2013.01)

(58) Field of Classification Search
CPC .............................. H01R 13/005; H02J 7/0042
USPC .......................................................... 320/109
See application file for complete search history.

(56) References Cited

U.S. PATENT DOCUMENTS

| | | | |
|---|---|---|---|
| 9,287,646 B2 | 3/2016 | Mark | |
| 9,321,362 B2 | 4/2016 | Woo et al. | |
| 10,377,264 B2 | 8/2019 | Lopez et al. | |
| 10,449,871 B1 * | 10/2019 | Lyon | ....................... B60L 53/14 |

(Continued)

FOREIGN PATENT DOCUMENTS

| | | |
|---|---|---|
| CN | 108199162 A | 6/2018 |
| CN | 208376550 | 1/2019 |

(Continued)

OTHER PUBLICATIONS

Extended European Search Report for EP Application No. 20177702.6, dated Nov. 19, 2020, 7 pages.

*Primary Examiner* — Bryce M Aisaka
(74) *Attorney, Agent, or Firm* — FOLEY & LARDNER LLP

(57) ABSTRACT

A liquid-cooled charging system for a vehicle is configured to dissipate heat generated during charging (including fast-charging) of an electrically-powered vehicle. The liquid-cooled charging system includes a charging assembly having an interface assembly configured to support a charging plug of a charging station and an energy transfer assembly configured to electrically couple the charging station to the battery of the vehicle during charging. Components of the charging assembly and energy transfer assembly also define a fluid circuit. A coolant system of the liquid-cooled charging system is fluidly connected to the fluid circuit, allowing coolant to flow through the fluid circuit to dissipate heat from the charging assembly components during charging of the vehicle.

20 Claims, 10 Drawing Sheets

(56) References Cited

U.S. PATENT DOCUMENTS

| | | |
|---|---|---|
| 10,644,439 B2 * | 5/2020 | Fuehrer ............... B60L 1/04 |
| 10,675,988 B2 * | 6/2020 | Fuehrer ............... B60L 53/16 |
| 10,756,498 B1 * | 8/2020 | Sarraf ............... B60L 53/302 |
| 11,469,531 B2 * | 10/2022 | Cole ............... H01R 13/73 |
| 2015/0217654 A1 | 8/2015 | Woo et al. |
| 2016/0221458 A1 | 8/2016 | Lopez et al. |
| 2019/0176653 A1 * | 6/2019 | Fuehrer ............... B60L 53/16 |
| 2019/0291588 A1 | 9/2019 | Chou et al. |
| 2019/0385765 A1 * | 12/2019 | Lyon ............... H01B 7/423 |
| 2020/0290469 A1 * | 9/2020 | Lu ............... H01M 10/613 |
| 2020/0303093 A1 * | 9/2020 | Cantz ............... H01R 9/11 |
| 2020/0307400 A1 * | 10/2020 | de Chazal ............... B60L 53/16 |
| 2020/0343022 A1 * | 10/2020 | Tasiopoulos ............... B60L 53/18 |
| 2020/0343610 A1 * | 10/2020 | Agathocleous ....... H01M 10/44 |
| 2020/0376970 A1 * | 12/2020 | Berggren ............... B60L 3/003 |
| 2020/0384875 A1 * | 12/2020 | Rhodes ............... B60L 53/11 |
| 2020/0391601 A1 * | 12/2020 | Maeshiro ............... B60L 53/16 |
| 2021/0063097 A1 | 3/2021 | Hitchcock et al. |

FOREIGN PATENT DOCUMENTS

| | | |
|---|---|---|
| DE | 10 2017 122 662 | 4/2019 |
| EP | 3 043 421 | 7/2016 |
| JP | 2019-115253 A | 7/2019 |
| WO | WO-2014/057876 | 4/2014 |
| WO | WO-2017/133893 | 8/2017 |
| WO | WO-2017/162494 | 9/2017 |

\* cited by examiner

LIQUID-COOLED CHARGING SYSTEM FOR A VEHICLE

CROSS-REFERENCE TO RELATED APPLICATIONS

This application is a continuation of U.S. application Ser. No. 16/517,031, filed on Jul. 19, 2019, which is incorporated by reference herein in its entirety.

BACKGROUND

The present disclosure relates generally to charging systems configured for use in electrically-powered vehicles. Despite the numerous benefits of electrically-powered vehicles, one obstacle such vehicles face is the increased time it takes to fully charge the battery of an electrically-powered vehicle as compared to the time required to fill an equivalently sized internal combustion engine powered vehicle with fuel.

DC fast charging has provided one option for reducing the time required to charge an electrically-powered vehicle. However, the high amounts of heat generated as a result of the high rates of power (and current) used during such charging may increase the resistance of the charging system of the vehicle to current flow (thereby increasing the time required to charge the vehicle), and—more seriously—may pose a risk of damaging the charging components of the vehicle. Given the limitations of existing fast-charging systems, it would be desirable to provide a charging system for an electrically-powered vehicle what would be capable of dissipating and/or mitigating the heat generated during such fast charging of a vehicle.

SUMMARY

In one implementation of the present disclosure, a housing for a charging system includes a mounting plate. A first opening and a second opening are each defined by and extend through the mounting plate. A charging port includes a port external portion and a port internal portion. The port external portion extends about the first and second openings and outwards from a front surface of the mounting plate. The port external portion is configured to engage and support a charging plug of a charging station. The port internal portion extends about each of the first and second openings and outwards from a rear surface of the mounting plate. The port internal portion includes a mounting body. A first passageway is defined by and extends through the mounting body from a rear portion of the mounting body. The first passageway is in fluid communication with the first opening. A second passageway is defined by and extends through the mounting body from the rear portion of the mounting body. The second passageway is in fluid communication with the second opening. A channel is defined by and extends through the mounting body. A first end of the channel is in fluid communication with the first passageway and a second end of the channel is in fluid communication with the second passageway.

In some embodiments, the mounting plate includes an attachment structure configured to attach the housing to a vehicle. In some embodiments, the port external portion is configured to accessible from an exterior of the vehicle when the mounting plate has been secured to the vehicle via the attachment structure. In some embodiments, the port external portion is configured to engage and support a charging plug used for DC fast charging. In some embodiments, each of the first and second openings in the mounting plate are configured to receive and support a contact terminal such that the contact terminal extends within the port external portion and is accessible from an exterior of the vehicle.

In one implementation of the present disclosure, a charging assembly kit includes a housing having a mounting plate and first and second energy transfer assemblies. A port structure extends outwards from a front surface of the mounting plate. A mounting body extends outward from a rear surface of the mounting plate. The mounting body includes a first passageway defined by and extending through the mounting body from a rear portion of the mounting body. A second passageway is defined by and extends through the mounting body from the rear portion of the mounting body. A channel is defined by and extends through the mounting body. The channel fluidly connects the first passageway and the second passageway. Each of the first energy transfer assembly and second energy transfer assembly include an electrical connector defining a channel therethrough and are formed of an electrically conductive material. The channel of the first electrical connector is configured to be fluidly coupled to the first passageway and the channel of the second electrical connector is configured to be fluidly coupled to the second passageway.

In some embodiments, the charging assembly kit further includes a first contact terminal and a second contact terminal each extending within the port structure. The first contact terminal is configured to be electrically coupled to the first electrical connector and the second contact terminal is configured to be electrically coupled to the second electrical connector. In some embodiments, a first terminal body is configured to be received within the first passageway and a second terminal body is configured to be received within the second passageway.

In some embodiments, each of the first terminal body and the second terminal body include a sidewall defining a hollow chamber. A first aperture extends through the sidewall of the first terminal body and a second aperture extends through the sidewall of the second terminal body. In some embodiments, the first aperture is configured to be in fluid communication with a first end of the channel extending through the mounting body when the first terminal connector is received within the first passageway. The second aperture is configured to be in fluid communication with a second end of the channel extending through the mounting body when the second terminal connector is received within the second passageway.

In some embodiments, the channel of the first electrical connector is configured to be in fluid communication with the channel of the second electrical connector when a first end of the first electrical connector is attached to the first terminal body and a first end of the second electrical connector is attached to the second terminal body.

In some embodiments, a second end of the first electrical connector and a second end of the second electrical connector are each configured to be fluidly coupled to a coolant source. In some embodiments, the second ends of each of the first electrical connector and second electrical connector are configured to be electrically coupled to a battery of a vehicle. In some embodiments, the first terminal connector electrically couples the first contact terminal to the first electrical connector and the second terminal connector electrically couples the second contact terminal to the second electrical connector.

In some embodiments, the charging assembly further includes a sealing body having a first receiving structure configured to receive the first electrical connector, a second receiving structure configured to receive the second electrical connector, and a body portion configured to surround and attach to at least a portion of an exterior surface of the mounting body.

In one implementation of the present disclosure, a charging housing comprising a first surface configured to be accessible from an exterior of a vehicle and a second surface configured to be inaccessible from an exterior of the vehicle is provided. A charging port configured to engage a charging plug of a charging station is provided on the first surface of the housing and a mounting body is provided on the rear surface of the housing. A first end of a first energy transfer assembly is arranged within the charging port of the housing such that the first end of the first energy transfer assembly is accessible from the exterior of the vehicle. A first end of a second energy transfer assembly is arranged within the charging port of the housing such that the first end of the second energy transfer assembly is accessible from the exterior of the vehicle. A second end of the first energy transfer assembly and a second end of the second energy transfer assembly are each fluidly coupled to a coolant source. The seconds of the first energy transfer assembly and the second energy transfer assembly are electrically coupled to a battery of the vehicle.

In some embodiments, fluidly coupling the second end of the first energy transfer assembly to a coolant source comprises fluidly coupling a coolant source of the vehicle to a first channel extending through at least a portion of the first energy transfer assembly. Fluidly coupling the second end of the second energy transfer assembly to a coolant source comprises fluidly coupling the coolant source of the vehicle to a second channel extending through at least a portion of the second energy transfer assembly.

In some embodiments, the first channel of the first energy transfer assembly and the second channel of the second energy transfer assembly are fluidly coupled to define a return fluid path. In some embodiments, fluidly coupling the first channel of the first energy transfer assembly and the second channel of the second energy transfer assembly includes coupling the first channel of the first energy transfer assembly to a first end of a fluid channel defined by and extending through the mounting body and coupling the second channel of the second energy transfer assembly to a second end of the fluid channel of the mounting body. In some embodiments, voltage isolation is provided between the first energy transfer assembly and the second energy transfer assembly.

DETAILED DESCRIPTION

Figure 1:
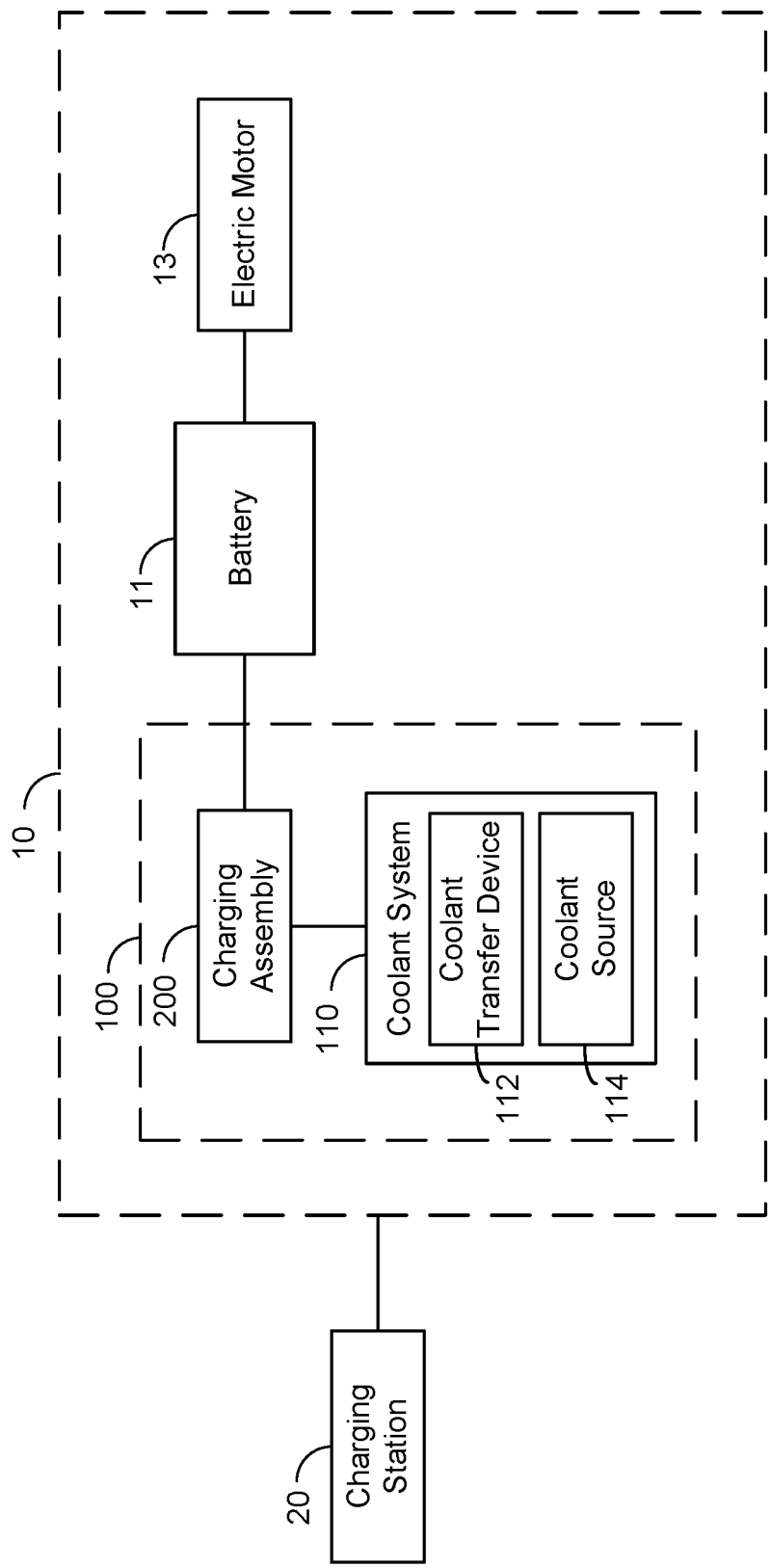
FIG. 1 is a block diagram illustrating a liquid-cooled charging system, according to an exemplary embodiment.

Referring to the FIGURES, a liquid-cooled charging system 100 configured to dissipate heat generated during charging of a fully or partially electrically-powered vehicle 10 (or during any other use of the vehicle 10) is described according to various embodiments. In general, as illustrated by FIG. 1, the liquid-cooled charging system 100 includes a charging assembly 200 via which an energy storage component (e.g. a battery 11) of a vehicle 10 may be electrically coupled to an external power source (e.g., via a charging station 20). The liquid-cooled charging system 100 also includes a coolant system 110 that is fluidly connected to one or more fluid circuits 290 of the charging assembly 200 that extend along, through, around, other otherwise adjacent one or more of the components defining the charging assembly 200.

The liquid-cooled charging system 100 may be configured to be used for both AC and DC charging of a vehicle 10 according to any number of different charging conditions and/or modes (e.g. Level 1, Level 2, Level 3, etc.). In various embodiments, the liquid-cooled charging system 100 may be configured to be used for DC fast charging (e.g., Level 3 charging, or other charging conditions in which the vehicle 10 may be provided power in excess of 20 kW, and more specifically in excess of approximately 50 kW, and even more specifically in excess of 150 kW and/or using current in excess of 50 A, and more specifically in excess of 100 A and/or using a VDC in excess of 200 V, and more specifically in excess of 400 V), as the increased rate of heat dissipation that the liquid-cooled charging system 100 is able to provide by flowing coolant from the coolant system 110 through the fluid circuit 290 of the charging assembly 200 to absorb heat from the charging assembly 200 may be particularly advantageous in mitigating the effects of the high levels of heat that are generated during charging of a vehicle 10 under such conditions.

Because the liquid-cooled charging system 100 is incorporated exclusively into the vehicle 10 (as opposed to being provided as a part of and/or incorporated into a charging station 20), the ability of the liquid-cooled charging system 100 to minimize the risk of heat-related damage associated with charging (particularly under DC fast charging conditions) is not dependent on the type of and/or features of the charging station 20 that is used to supply energy to the vehicle 10. Accordingly, the liquid-cooled charging system 100 is configured to allow a vehicle 10 to be quickly and safely charged, irrespective of the type of charging (e.g. DC fast charging) and/or whether the charging station 20 being used to charge the vehicle 10 includes any heat-dissipation features.

As illustrated in FIG. 1, according to various embodiments, the coolant system 110 of the liquid-cooled charging system 100 includes a pump 112 (or any other fluid transfer device), a coolant source 114, and a cooling assembly 116. In some embodiments, the various components of the coolant system 110 may be defined by components of an existing vehicle coolant system configured to dissipate heat from other components of the vehicle 10. For example, the coolant source 114 may be configured to supply coolant to both the electric motor 13 of the vehicle 10 and to the components of the charging assembly 200 of the liquid-cooled charging system 100. Accordingly, as will be appreciated, the liquid-cooled charging system 100 may advantageously be incorporated into a vehicle 10 without adding significant additional components and/or weight to the vehicle 10, and may also allow for a vehicle 10 to be retrofitted to include a liquid-cooled charging system 100 as described herein without requiring significant redesign and/or modification of the vehicle 10 to do so. Alternatively, in other embodiments, some or all of the components of the coolant system 110 may be discrete and separate components from existing components of the vehicle 10 coolant system. For example, coolant source 114 of the coolant system 110 may be distinct from an additionally provided coolant source used to cool other components of the vehicle 10.

Pump 112 is configured to transfer a fluid coolant (in liquid and/or gaseous form) between the coolant source 114, the cooling assembly 116, and the fluid circuit(s) 290 of the charging assembly 200. The cooling assembly 116 may include any number of, or combination of, heat dissipation devices (e.g., a radiator, a fan, etc.) configured to cool the fluid coolant as the coolant circulates between and through the coolant system 110 and the charging assembly 200. Although the coolant system 110 illustrated in FIG. 1 is shown as only including a single pump 112, it should be understood that any number of pumps 112 may be used. Additionally, although the coolant system 110 illustrated in FIG. 1 is shown as only including a single coolant source 114, it should be understood that any number of coolant sources 114 may be used.

As shown in FIG. 1, the charging assembly 200 of the liquid-cooled charging system 100 includes a liquid-cooled energy transfer assembly 210 via which energy from the charging station 20 is supplied to the battery 11 to charge the vehicle 10, an interface assembly 250 configured to support both the liquid-cooled energy transfer assembly 210 relative to the vehicle 10 and a charging plug of the charging station 20 relative to the vehicle 10 during charging; and a fluid circuit 290 via which coolant provided by the coolant system 110 may flow to dissipate, and thereby mitigate the effects of, heat generated during charging of the vehicle 10 and/or other use of the vehicle 10. A charging assembly 200 according to one example embodiment is shown in and described with reference to FIGS. 2A-9B.

Figure 2A:
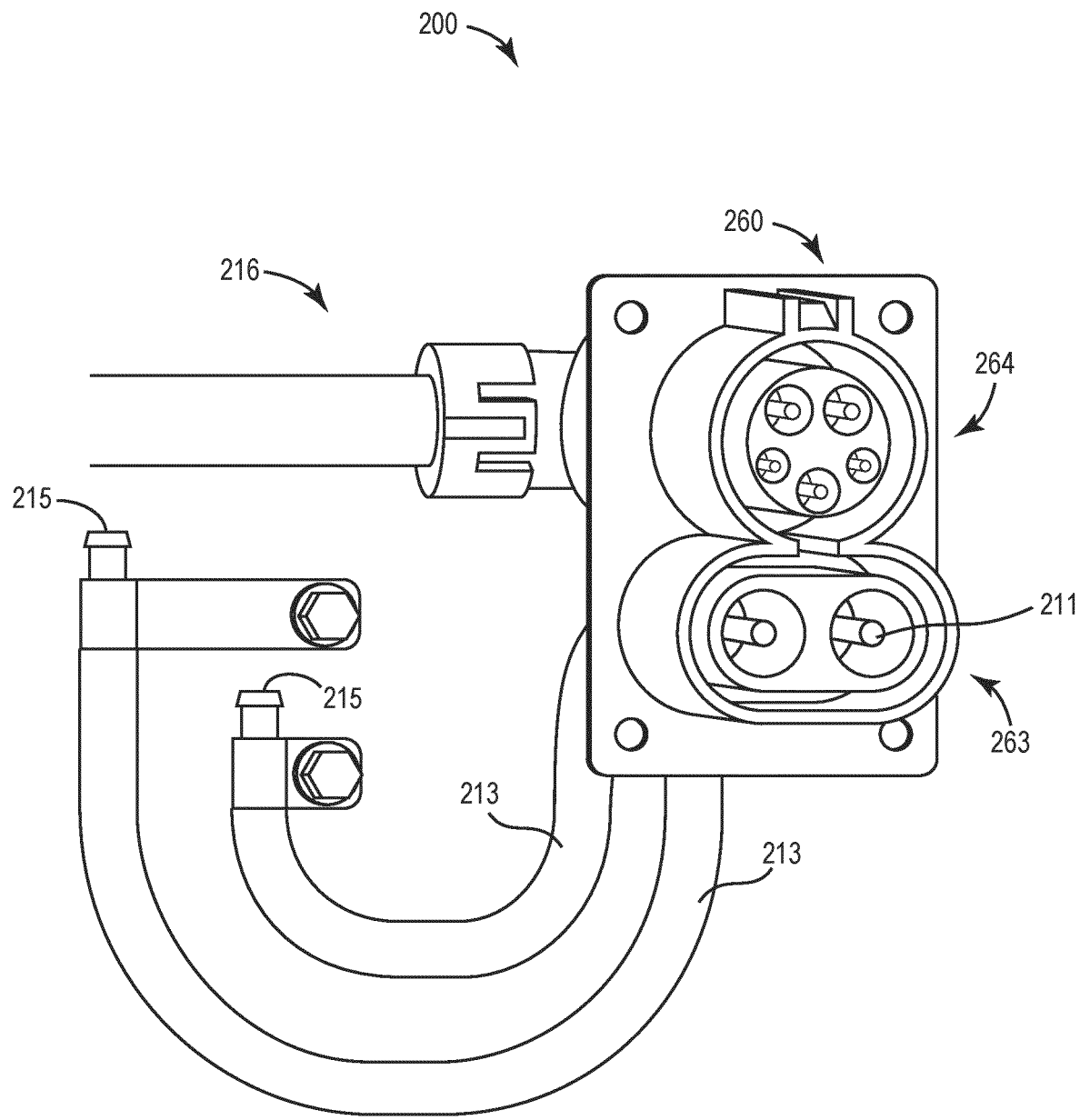
FIG. 2A is a front view of a charging assembly of a liquid-cooled charging assembly, according to an exemplary embodiment.
Figure 2B:
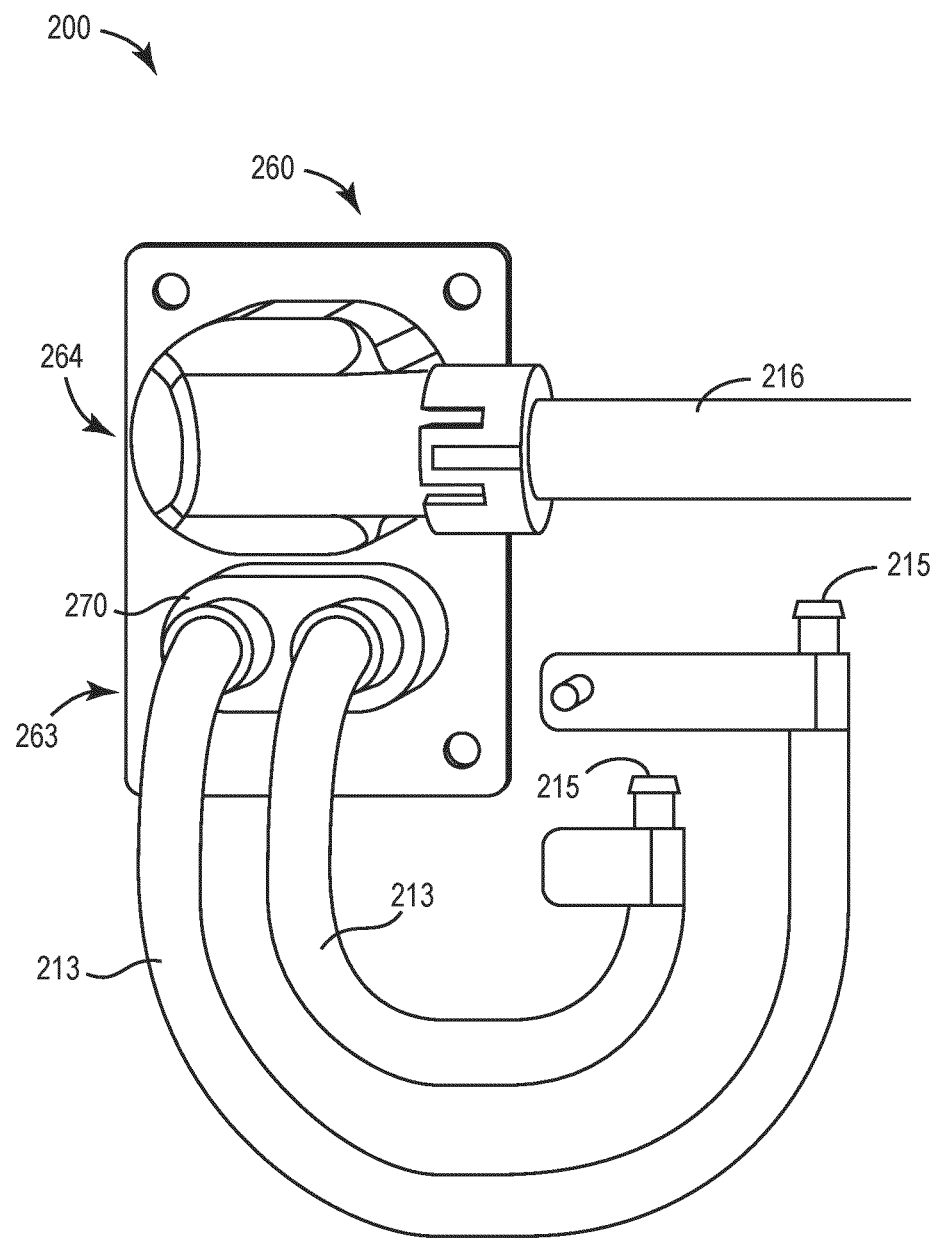
FIG. 2B is a rear view of the charging assembly of FIG. 2A, according to an exemplary embodiment.

Illustrated in FIGS. 2A and 2B are front and rear views, respectively, of an assembled charging assembly 200 according to one example embodiment. As shown in FIG. 2A, a mounting plate 261 of the interface assembly 250 comprises a front surface 261a from which a liquid-cooled charging port external portion 263a extends. As will be described in more detail below, the mounting plate 261 is configured to be attached to the vehicle 10 so that the liquid-cooled charging port external portion 263a is accessible from an exterior of the vehicle 10. The liquid-cooled charging port external portion 263a is configured to be physically engaged by a charging plug of a charging station 20, allowing the charging plug to be supported relative to the vehicle 10 during charging. As shown in FIG. 2B, provided on the rear surface 261b of the mounting plate 261 is a liquid-cooled charging port internal portion 263b. As will be described in more detail below, in addition to supporting the components of the one or more liquid-cooled energy transfer assemblies 210 relative to the vehicle 10, the liquid-cooled charging port internal portion 263b defines a part of the fluid circuit 290 of the charging assembly 200.

During charging of the vehicle 10, energy from the charging station 20 is transferred to the battery 11 of the vehicle 10 via a liquid-cooled energy transfer assembly 210. As shown in FIG. 2A, each liquid-cooled energy transfer assembly 210 comprises a first, external end defined by a contact terminal 211 that is supported within the liquid-cooled charging port 263, so as to be accessible from an exterior of the vehicle 10. As illustrated by FIG. 2B, extending from the liquid-cooled charging port internal portion 263b, and electrically coupled to each contact terminal 211, is an internally extending electrical connector comprising a hollow, tubular conductive tube 213 that defines the second, internal end of each liquid-cooled energy transfer assembly 210. During charging, the conductive tube 213 is configured to transfer energy received by the contact terminal 211 from the charging plug of the charging station 20 to the battery 11, to which the conductive tube 213 is electrically connected via an attachment connector 215. As an alternative to the hollow, tubular conductive tube 213 structure that defines the electrical connector of the liquid-cooled charging system 100 embodiment shown in FIG. 2B, in other embodiments, the electrical connector may instead be defined by a variety of other structures configured to electrically couple the contact terminal 211 with the battery 11 of vehicle 10, such as, e.g. an electrical wire.

As illustrated in the charging assembly 200 embodiment of FIGS. 2A-9B, in various embodiments, the charging assembly 200 may comprise first and second liquid-cooled energy transfer assemblies 210, with the first liquid-cooled energy transfer assembly 210 being electrically coupled via a first attachment connector 215 to a negative terminal of the battery 11 and the second liquid-cooled energy transfer assembly 210 being electrically coupled to a positive terminal of the battery 11 via a second attachment connector 215, such that the first and second liquid-cooled energy transfer assemblies 210 define an electrical circuit via which electricity may flow when a charging plug of a charging station 20 is brought into electrical (and optionally physical) contact with the contact terminals 211.

As will be discussed in more detail below, in various embodiments (such as the embodiment described with reference to FIGS. 2A-9B), in addition to defining a portion of the liquid-cooled energy transfer assembly 210, the conductive tube 213 may additionally define a channel 214 that defines a portion of the fluid circuit 290 of the charging assembly 200. As such, in addition to electrically coupling the conductive tubes 213 to the battery 11, the attachment connectors 215 may additionally be configured to fluidly connect the conductive tubes 213 to the coolant system 110 of the liquid-cooled charging system 100.

As shown in FIGS. 2A and 2B, according to various embodiments, the interface assembly 250 may include one or more charging ports 264 in addition to the liquid-cooled charging port 263, with the charging assembly 200 additionally including an energy transfer assembly 216 supported relative to each of the additionally provided charging ports 264. In some embodiments, some or all of the additionally provided charging ports 264 and energy transfer assemblies 216 may be defined as liquid-cooled charging ports 263 and/or liquid-cooled energy transfer assemblies 210 that define and/or include a fluid circuit 290 (such as, e.g., described with reference to any of the embodiments of the liquid-cooled charging ports 263 and/or liquid-cooled energy transfer assemblies 210 disclosed herein). According to other embodiments, the additional charging ports 264 and/or energy transfer assemblies 216 included in the charging assembly 200 may be defined by any number of other configurations and arrangements.

Figure 3:
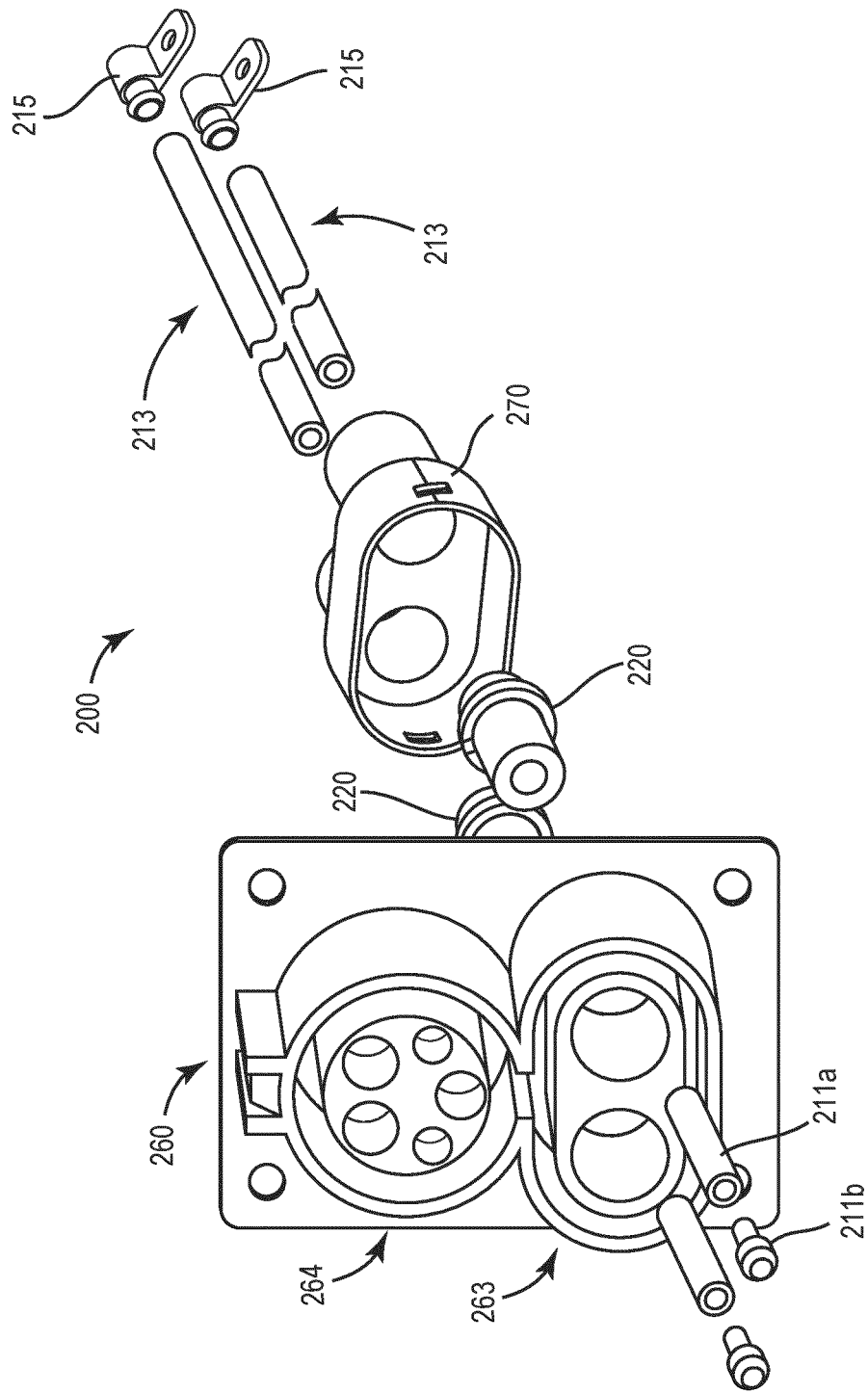
FIG. 3 is an exploded view of the charging assembly of FIGS. 2A and 2B, according to an exemplary embodiment.

Referring to FIG. 3, an exploded view of a charging assembly 200 illustrating the various components of the liquid-cooled energy transfer assembly 210 and the interface assembly 250 is shown according to an example embodiment. As will be described in more detail below, each liquid-cooled energy transfer assembly 210 of the charging assembly 200 embodiments of FIGS. 2A-9B comprises a contact terminal 211 (including a body 211a and optional plug 211b), a terminal body 220, a conductive tube 213, and an attachment connector 215, while each interface assembly 250 comprises a housing 260 and an optional sealing body 270.

Figure 4:
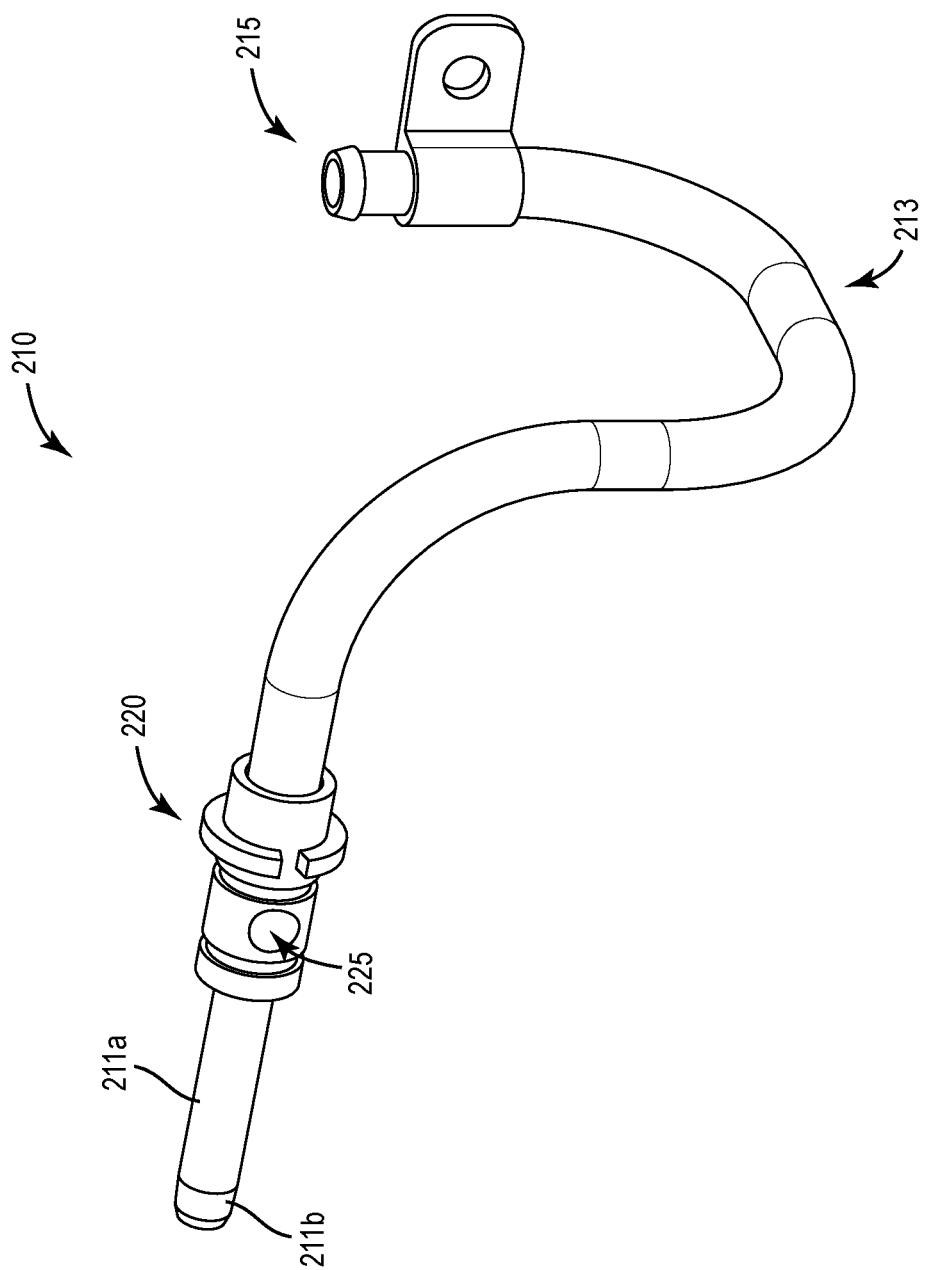
FIG. 4 is a perspective view of a liquid-cooled energy transfer assembly of the charging assembly of FIGS. 2A and 2B, according to an exemplary embodiment.
Figure 5:
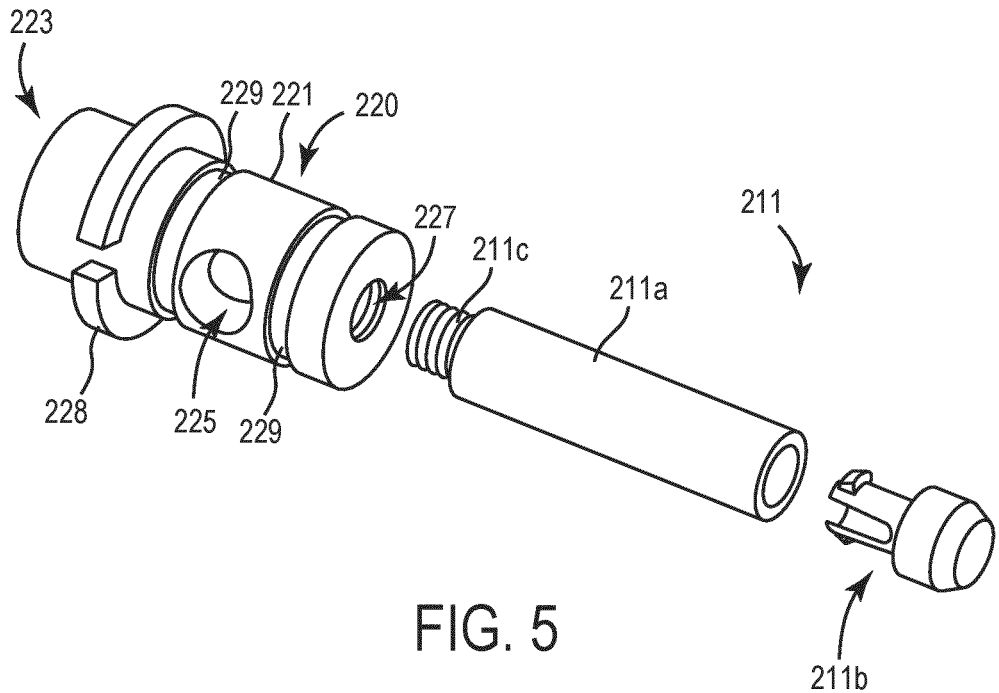
FIG. 5 is a perspective view of components of an energy transfer assembly of the charging assembly of FIGS. 2A and 2B, according to an exemplary embodiment.
Figure 6:
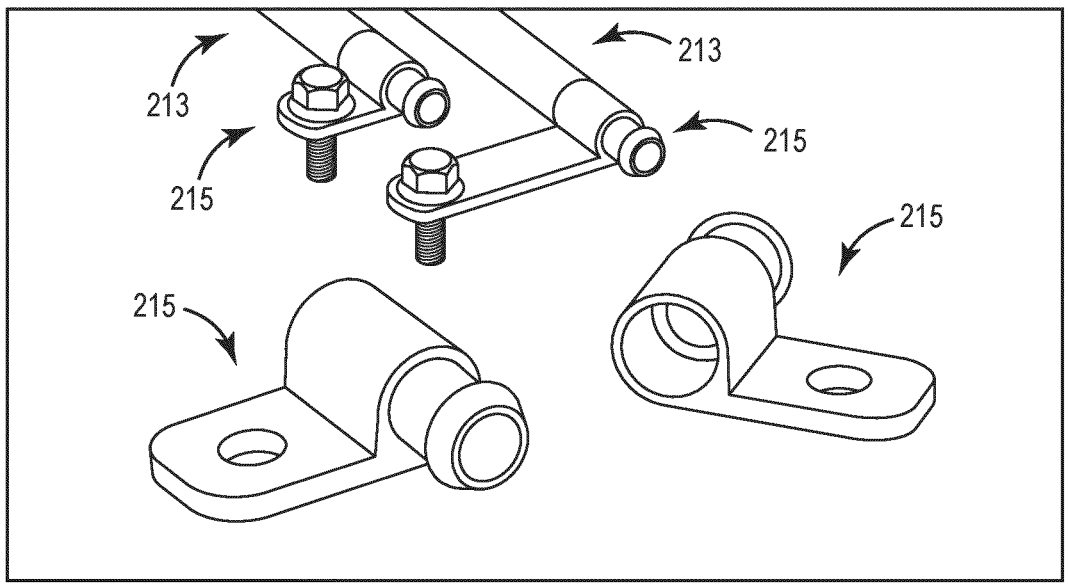
FIG. 6 is a perspective view of components of an energy transfer assembly of the charging assembly of FIGS. 2A and 2B, according to an exemplary embodiment.
Figure 9A:
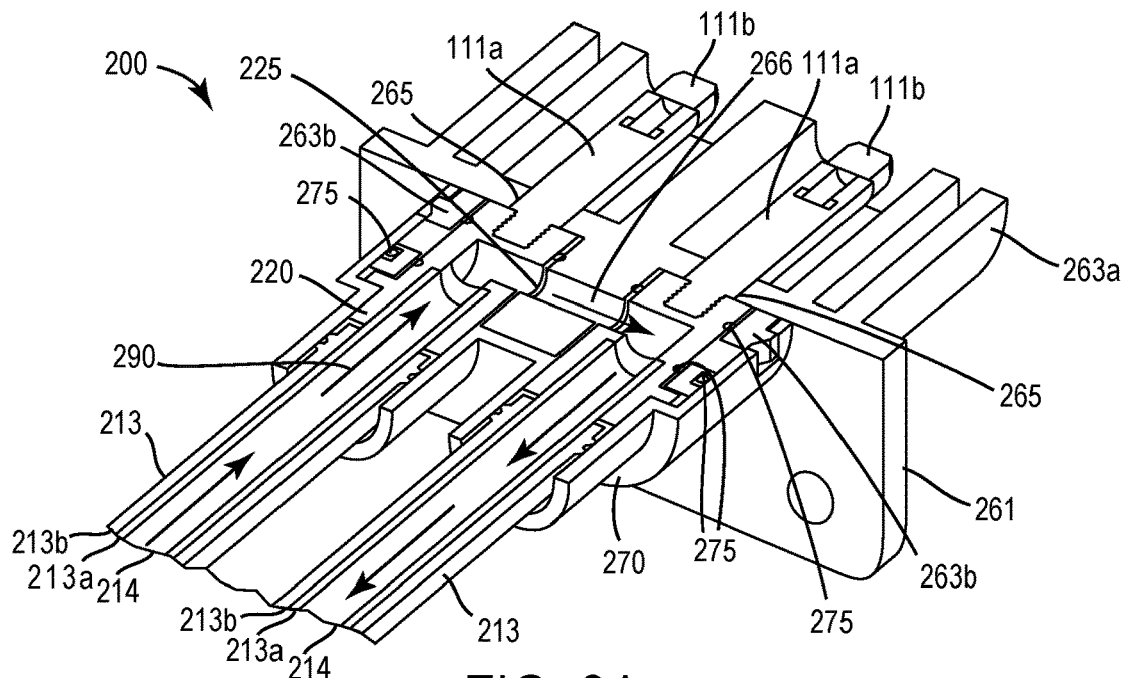
FIG. 9A is an assembled, perspective, cross-sectional view of the charging assembly FIGS. 2A and 2B, according to an exemplary embodiment.

Turning to FIGS. 4-6, components of a liquid-cooled energy transfer assembly 210 are shown, according to one example embodiment. A contact terminal 211 is shown according to an example embodiment in FIG. 5. The contact terminal 211 is configured to electrically and physically engage with a charging plug of a charging station 20 during charging of the vehicle 10. Accordingly, as illustrated by FIGS. 2B and 9A, the contact terminal 211 is configured to extend through an opening 265 in the mounting plate 261 and within the liquid-cooled charging port external portion 263a of the housing 260 of the interface assembly 250, such that at least a portion of the contact terminal 211 is accessible from an exterior of the vehicle 10. The contact terminal 211 is defined by a rigid body 211a formed of an electrically conductive material. According to some embodiments, a non-conductive plug 211b may be integrally or removably attached to front portion of the contact terminal 211.

As also shown in FIGS. 5 and 9A, each contact terminal 211 may be mounted relative to the housing 260 of the charging assembly 200 and electrically coupled to an conductive tube 213 via a terminal body 220. A rear threaded portion 211c of the contact terminal 211 may be configured to releasably attach the contact terminal 211 to a threaded opening 227 of a terminal body 220. According to other embodiments, the contact terminal 211 and terminal body 220 may be releasably engaged via any other number of engagement structures. In some embodiments, the contact terminal 211 may alternatively be fixedly and irremovably coupled to the terminal body 220, such as, e.g., by forming the contact terminal 211 and terminal body 220 as an integral or monolithic structure.

Figure 9B:
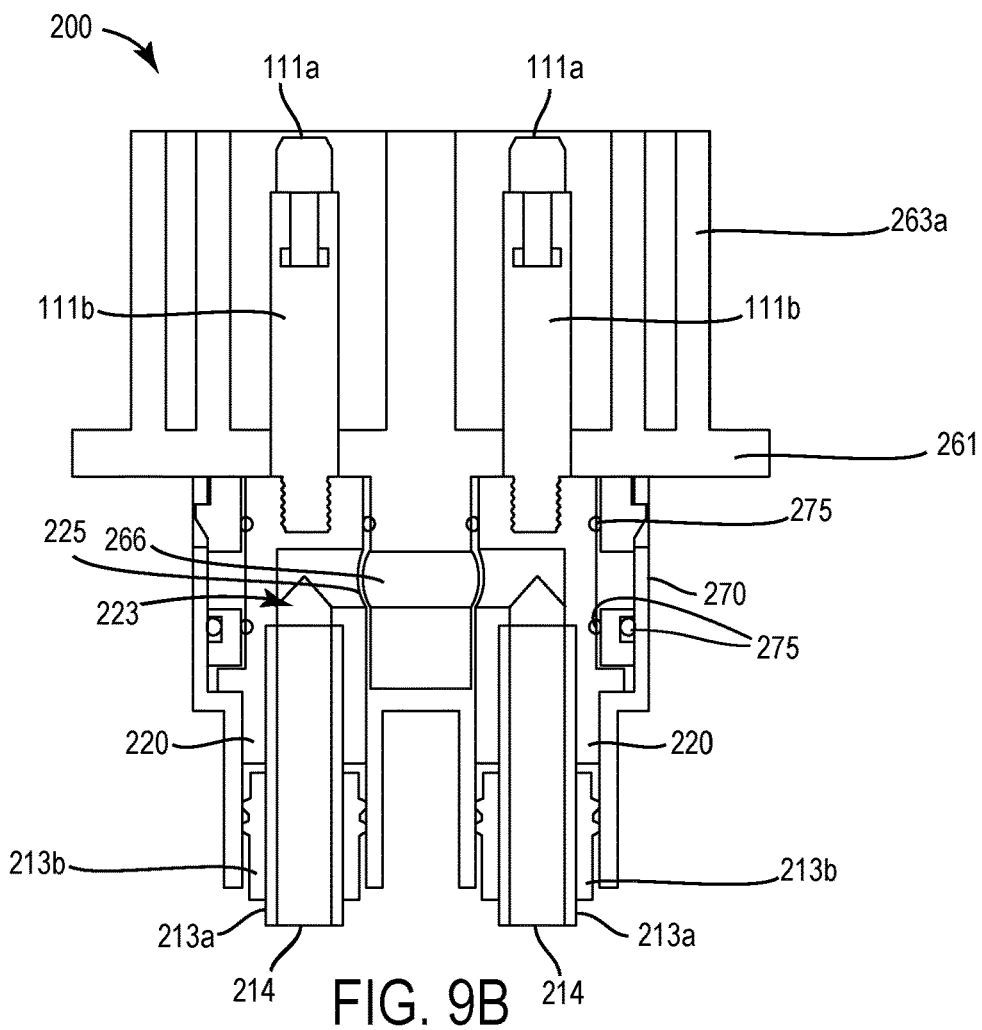
FIG. 9B is an assembled, top, cross-sectional view of the charging assembly of FIGS. 2A and 2B, according to an exemplary embodiment.

As illustrated by FIG. 5, a sidewall 221 forming the terminal body 220 defines a hollow chamber 223, with an aperture 225 formed in the sidewall 221 providing fluid communication between an exterior and an interior of the chamber 223. Referring to FIGS. 9A and 9B, each terminal body 220 is configured to be at least partially received within a passageway 268 extending within a mounting body 267 defined by the liquid-cooled charging port internal portion 263b. As shown in FIGS. 9A and 9B below, the aperture 225 of the sidewall 221 is sized and spaced along the terminal body 220 such that the aperture 225 may be aligned with the channel 266 defined by the mounting body 267 when the terminal body 220 is mounted within a mounting body 267 passageway 268.

According to some embodiments, the terminal body 220 may optionally include a locating structure, such as, e.g., a slotted locating ring 228 formed about the exterior surface of the sidewall 221 of the terminal body 220 as illustrated in FIG. 5, that is configured to orient the terminal body 220 relative to the mounting body 267 such that the aperture 225 of the terminal body 220 and the channel 266 of the mounting body 267 are aligned upon assembly of the charging assembly 200. As also shown in FIG. 5, according to some embodiments, optional O-ring receiving grooves 229 may be defined by portions of the sidewall 221 extending above and/or below the aperture 225. Upon assembly of the charging assembly 200, optionally included O-rings 275 positioned within the grooves 229 are configured to sealingly engage the portion of the mounting body 267 defining the passageway 268 within which the terminal body 220 has been received to minimize, or prevent, fluid coolant flowing through the fluid circuit 290 defined by the hollow chamber 223 and channel 266 from leaking.

Coupled to a rear end of the terminal body 220 is a front end of an conductive tube 213 configured to electrically couple the contact terminal 211 with the battery 11 of the vehicle 10. As illustrated by FIGS. 6 and 9A, the conductive tube 213 defines a hollow, tubular conduit formed of an electrically conductive material 213a having an exterior surface and an interior surface defining a channel 214. According to various embodiments, a portion of, or the entirety of, the exterior and/or interior surface of the conductive tube 213 may be coated with an insulating coating 213b. As shown in FIGS. 9A and 9B, a front end of each conductive tube 213 is attached to a rear end of the terminal body 220 (e.g. via soldering, using a compression nut, flare end and nut, welding, etc.), such that the channel 214 of the conductive tube 213 is in fluid communication with the chamber 223 of the terminal body 220, thus also defining a portion of the fluid circuit 290.

Referring to FIG. 6, attachment connectors 215 configured to couple the rear ends of the conductive tubes 213 to the battery 11 of the vehicle 10 and the coolant system 110 are shown, according to an exemplary embodiment. Although the attachment connectors 215 are shown as discrete components configured to be releasably engaged with the rear ends or the conductive tubes 213 (as illustrated by the assembled view of FIG. 6), in other embodiments, attachment connectors 215 may be components provided integrally with the conductive tubes 213. According to other embodiments, any number of other attachment components and/or methods (e.g., welding, threaded fastening, adhesive materials, etc.) configured for electrically coupling the conductive tubes 213 to the battery 11 and/or for fluidly coupling the conductive tubes 213 to the coolant system 110 may be used. In some embodiments, the coolant system 110 may be partially or entirely defined by components of a battery 11 cooling system of the vehicle 10, such that the physical coupling of the rear ends of the conductive tubes 213 to the battery 11 via the attachment connectors 215 both electrically couples the conductive tubes 213 to the battery 11 and fluidly couples the channels 214 of the conductive tubes 213 to the coolant system 110.

Figure 7A:
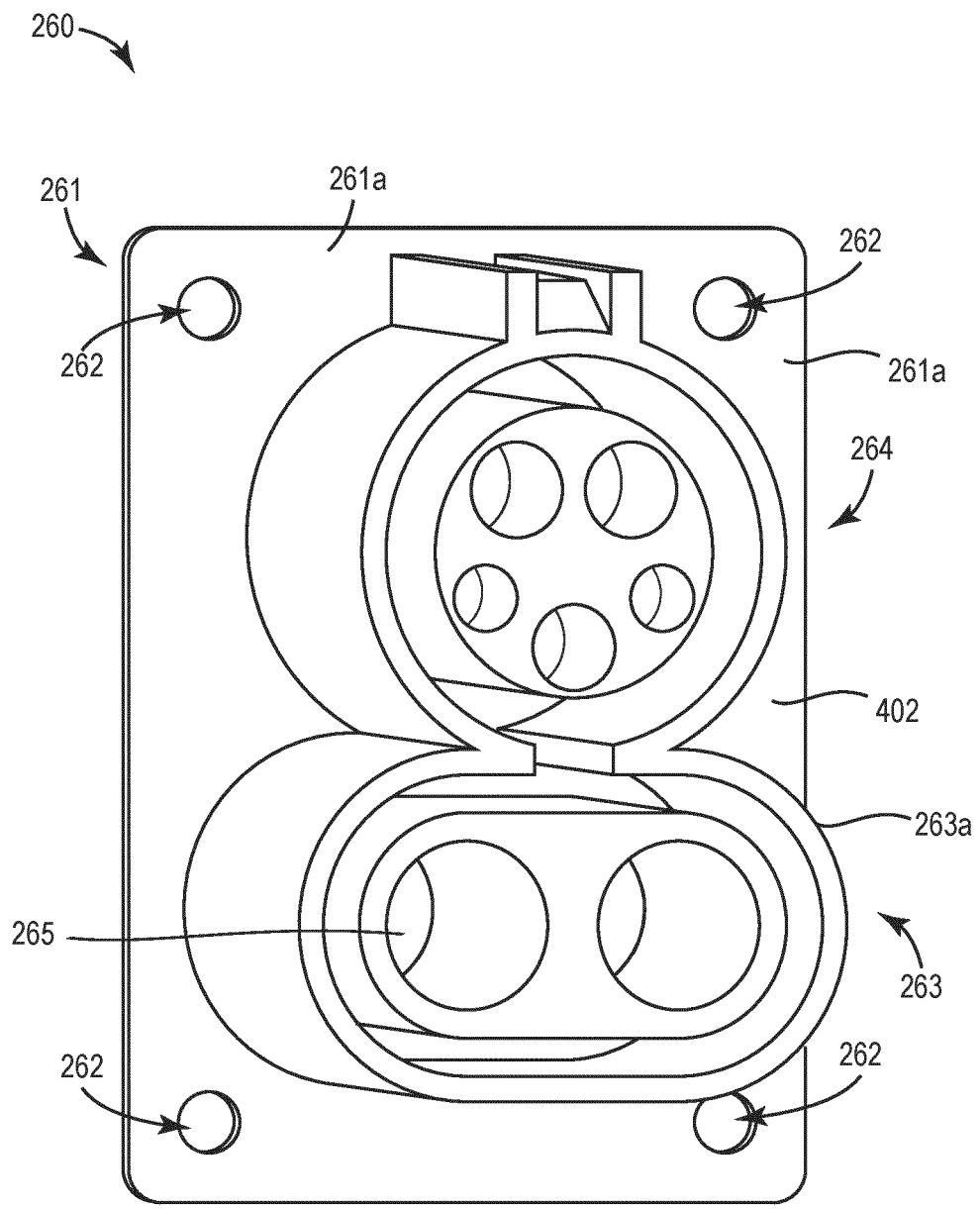
FIG. 7A is a front perspective view of a housing of the charging assembly of FIGS. 2A and 2B, according to an exemplary embodiment.
Figure 7B:
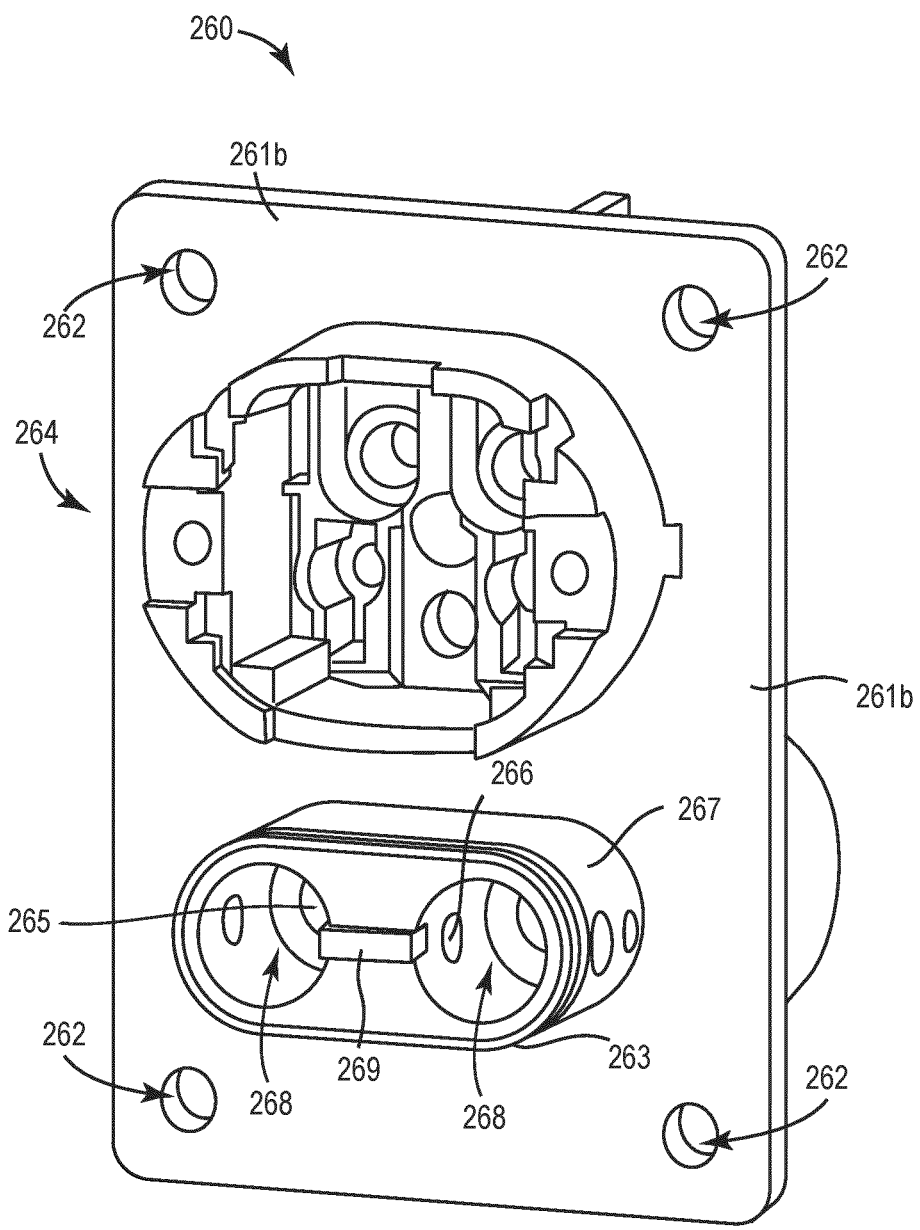
FIG. 7B is a rear view of the housing of the charging assembly of FIGS. 2A and 2B, according to an exemplary embodiment.

Turning to FIGS. 7A and 7B, front and rear views, respectively, of a housing 260 of the interface assembly 250 is shown, according to one embodiment. As shown in FIGS. 7A and 7B, the housing 260 includes a mounting plate 261 from which a liquid-cooled charging port 263 (and optionally one or more additional charging ports 264) extend. The mounting plate 261 may be formed having any shape (e.g., rectangular, circular, square, etc.), and may include and/or define any number of, or combination of, different attachment structures via which the housing 260 may be mounted relative to the vehicle 10. For example, in some embodiments, the attachment structures may define apertures 262 through which any number of different fastening elements may be inserted to secure the housing 260 to the vehicle 10.

As discussed above, the liquid-cooled charging port external portion 263a that extends from the front surface 261a of the mounting plate 261 about one or more openings 265 extending through the mounting plate 261 defines a physical interface which a charging plug of a charging station 20 may engage during charging, so as to support the charging plug relative to the vehicle 10. As such, according to various embodiments, the configuration of the liquid-cooled charging port external portion 263a may be defined by arrangements, sizes, dimensions, etc. that correspond to any number of different charging plug configurations used in AC and/or DC charging, such as, e.g. those described with reference to "SAE International Standards for Electrical Connectors for Electric Vehicles," or any other number of different standards that govern charging plug configurations. In various embodiments, the liquid-cooled charging port external portion 263a may advantageously be configured to engage a charging plug capable of being used to provide DC fast charging.

Referring to FIG. 7B, a liquid-cooled charging port internal portion 263b is illustrated according to an example embodiment. As shown in FIG. 7B, the liquid-cooled charging port internal portion 263b is defined by a mounting body 267 that is sealing engaged to, integrally attached to, and/or monolithically formed with the rear surface 261b of the mounting plate 261 about the one or more openings 265 extending through the mounting plate 261. A plurality of discrete passageways 268 extend through the mounting body 267, with each passageway 268 extending between a rear opening defined in a rear surface of the mounting body 267 and one of the openings 265 extending through the mounting plate 261. As noted above, the passageways 268 of the mounting body 267 are each sized and shaped so as to support a terminal body 220 therein, with a channel 266 which defines a portion of the fluid circuit 290 fluidly connecting each of the passageways 268.

As shown in FIG. 7B, according to various embodiments, an alignment structure may optionally be provided on the mounting body 267. Similar to the optionally provided locating feature of the terminal bodies 220, the alignment structure is configured to orient the terminal body 220 relative to the mounting body 267 such that the apertures 225 of the terminal bodies 220 and the channel 266 of the mounting body 267 are aligned upon assembly of the charging assembly 200. In some embodiments, the alignment structure of the mounting body 267 (such as, e.g., the locating strut 269 shown in FIG. 7B) may be configured to interact with the locating feature of the terminal bodies 220 (e.g. the slotted locating ring 228) of the terminal bodies 220 to facilitate the alignment of the terminal bodies 220 within the passageways 268 of the mounting body 267.

Figure 8A:
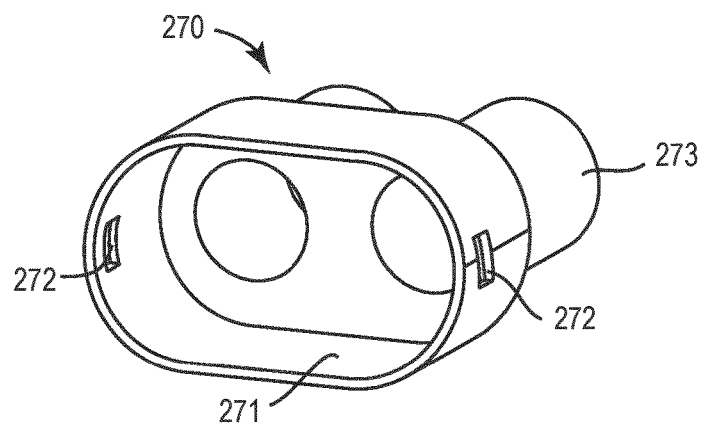
FIG. 8A is a front perspective view of a sealing body of the charging assembly of FIGS. 2A and 2B, according to an exemplary embodiment.
Figure 8B:
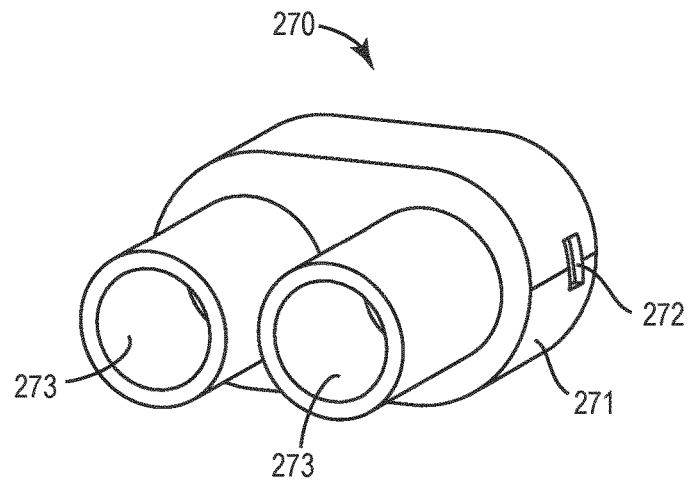
FIG. 8B is a rear perspective view of a sealing body of the charging assembly of FIGS. 2A and 2B, according to an exemplary embodiment.

As shown in FIGS. 8A and 8B, according to various embodiments, the interface assembly 250 may optionally additionally include a sealing body 270 configured to attach to the liquid-cooled charging port internal portion 263b to secure the physical attachment of the conductive tubes 213 and terminal bodies 220 relative to one another and/or relative to the mounting body 267 (e.g., by applying a compressive force in radial and/or longitudinal directions to the conductive tubes 213 and/or terminal bodies 220 via the engagement of the sealing body 270 with the liquid-cooled charging port internal portion 263b). Additionally, the engagement of the sealing body 270 with an exterior of the liquid-cooled charging port internal portion 263b may be configured to form a sealed cavity capable of substantially preventing the transmission of fluid coolant from the junctions between the channels 214 of the conductive tubes 213 and the chambers 223 of the terminal bodies 220 and/or the junctions between the chambers 223 of the terminal bodies 220 and the channel 266 of the mounting body 267 to the external environment. As shown in FIGS. 9A and 9B, according to various embodiments, one or more O-rings 275 may optionally be provided between the sealing body 270 and liquid-cooled charging port internal portion 263b interface to further increase the protection against the leakage of coolant fluid.

As also shown in FIGS. 8A and 8B, according to an example embodiment, the sealing body 270 may define a unitary structure comprising a body portion 271 and two receiving structures 273 through which the conductive tubes 213 are configured to be inserted. The sealing body 270 may be configured to be slid over the attachment between the terminal bodies 220 and the conductive tubes 213 and into engagement (e.g., via a snap fit, interference fit, cam fit, etc.) with the liquid-cooled charging port internal portion 263b via an engagement of an one or more attachment structures (e.g., openings 272) with one or more corresponding structures provided about the exterior of the liquid-cooled charging port internal portion 263b. In other embodiments, the sealing body 270 may be defined by any number of other engagement structures and/or arrangements via which the sealing body 270 may be attached to the liquid-cooled charging port internal portion 263b.

Referring now to FIGS. 9A and 9B, assembled views of the charging assembly 200, and the fluid circuit 290 of the charging assembly 200, are shown according to an example embodiment. As shown in FIGS. 9A and 9B, upon insertion of the terminal bodies 220 into the passageways 268 of the mounting body 267 of the housing 260 and attachment of the front ends of the conductive tubes 213 to the terminal bodies 220, the channels 214 defined by the conductive tubes 213, the chambers 223 and apertures 225 of the terminal bodies 220 and the channel 266 of the mounting body 267 define a fluid circuit 290. Upon fluidly connecting the rear ends of the conductive tubes 213 to the coolant system 110 (via, e.g., attachment connectors 215), the fluid circuit 290 may define a return fluid path via which coolant from the coolant system 110 may flow, as indicated by the arrows in FIG. 9A. As coolant from the coolant source 114 is forced through the fluid circuit 290 by the pump 112 of the coolant system 110, heat from the various components of the charging assembly 200 (generated, e.g., as a result of DC fast charging of the battery 11 of the vehicle 10), may be dissipated at an increased rate. As discussed above, this increased ability provided by the fluid circuit 290 to dissipate heat may advantageously allow for higher power and/or greater currents to be used during charging of the battery, thus enabling faster charging of the battery 10.

According to various embodiments, the dimensions of the fluid path defined by the fluid circuit 290 (e.g., the radii and lengths of the channels 213, chambers 223, apertures 225 and/or channel 266, etc.), as well as the desired flow rate of fluid coolant through the fluid circuit 290, may be varied depending on any number of different factors, such as, e.g., the types of vehicle 10 with which the liquid-cooled charging system 100 is used, the desired degree/rate of heat dissipation, etc. In embodiments in which more than one fluid circuit 290 is defined and/or included in the charging assembly 200, the flow of coolant may optionally be controlled independently for each of the fluid circuits 290.

Although in the embodiment of the charging system 200 described with reference to FIGS. 2A-9B, the fluid circuit 290 has been described as being defined by components of each of the interface assembly 250 (i.e. the channel 266 of the housing 260) and the energy transfer assembly 210 (i.e. the channels 214 of the conductive tubes 211 and the chamber 223 and apertures 225 of the terminal bodies 220), in other embodiments, the charging system 200 may be defined by any number of other fluid circuit 290 configurations. As non-limiting examples, in other embodiments, the fluid circuit 290 may be defined entirely by one or more components of the energy transfer assembly 210 exclusively, by one or more components of the interface assembly 250 exclusively, by other combinations of the components of the energy transfer assembly 210 and interface assembly 250, etc.

For example, instead of the return portion of the return path of the fluid circuit 290 being defined by one of the energy transfer assemblies 210 (such as, e.g., shown in the arrows of FIG. 9A indicating the flow of coolant out of the energy transfer assembly 210), according to some embodiments, each of the energy transfer assemblies 210 may be individually, and optionally separately, connected to additionally included channel(s) defined by and/or included in the charging assembly 200 that define the return path via which coolant that has entered into each energy transfer assembly 210 may return to the coolant system 110. In some such embodiments, the additional channels may, for example, be defined within portions of the walls defining the conductive tubes 213 (such that the conductive tubes 213 each define multi-lumen structures). In other such embodiments, the additional 'return' channels may, for example, be defined by one or more additional conduits that are fluidly coupled to the channel 266 of the mounting body 267 of the housing 260. In other embodiments, the coolant system 110 may optionally be fluidly connected with the chamber defined between the sealing body 270 and the exterior of the liquid-cooled charging portion internal portion 263b via inlet and outlet ports provided on the sealing body 270 (not shown).

In yet other embodiments, the fluid circuit 290 may be entirely defined by one or more components additionally included in the charging system 200 provided apart from the various components of the charging system 200 described herein with references to FIGS. 2A-9B. For example, according to some embodiments, additionally included fluid conduits (not shown) that are fluidly coupled to the coolant system 110 and which define a return fluid path may be disposed or otherwise arranged about the exterior surfaces some or all of the components of the charging assembly 200. For example, a helically wound conduit fluidly connected at inlet and outlet ends to the coolant system 110 may be disposed about and surround the exterior of each energy transfer assembly 210. As will be understood, in some such embodiments, the components of the energy transfer assembly 210 and/or interface assembly 250 may be formed without any channels, chambers, apertures, etc. that would define a fluid circuit 290 through which the coolant may flow. For example, according to some such embodiments, the energy transfer assemblies may be defined by solid electrical wires that extend between the battery 11 and an exteriorly accessible contact terminal.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A housing for a charging system, the housing comprising:
   a first opening and a second opening; and
      a port extending about each of the first and second openings and outwards from a rear surface of a mounting plate, the port including a mounting body comprising:
         a first passageway defined by and extending through the mounting body from a rear portion of the mounting body, wherein the first passageway is in fluid communication with the first opening, and wherein a pump transfers coolant through the first passageway to a battery; and
         a second passageway defined by and extending through the mounting body from the rear portion of the mounting body, wherein the second passageway is in fluid communication with the second opening, and wherein the pump transfers coolant through the second passageway to the battery.

2. The housing of claim 1, wherein further comprising the mounting plate, the mounting plate including an attachment structure configured to attach the housing to a vehicle.

3. The housing of claim 2, wherein the port includes a port external portion, and wherein the port external portion is configured to be accessible from an exterior of the vehicle when the mounting plate has been secured to the vehicle via the attachment structure.

4. The housing of claim 1, wherein the port includes a port external portion extending about the first and second openings, and wherein the port external portion is configured to engage and support a charging plug for DC fast charging.

5. The housing of claim 4, wherein each of the first and second openings in the mounting plate are configured to receive and support a contact terminal such that the contact terminal extends within the port external portion and is accessible from an exterior of the vehicle.

6. A charging assembly kit comprising:
a housing comprising:
a mounting plate comprising an attachment structure configured to attach the housing to a vehicle;
a mounting body extending outward from a rear surface of the mounting plate, the mounting body comprising:
a first passageway defined by and extending through the mounting body from a rear portion of the mounting body, wherein a pump transfers coolant through the first passageway to a battery; and
a second passageway defined by and extending through the mounting body from the rear portion of the mounting body, wherein the pump transfers coolant through the second passageway to the battery; and
a first and a second energy transfer assembly, each of the first energy transfer assembly and second energy transfer assembly comprising an electrical connector defining a channel therethrough;
wherein the first electrical connector is configured to be fluidly coupled to the first passageway and the second electrical connector is configured to be fluidly coupled to the second passageway.

7. The charging assembly kit of claim 6, further comprising a first contact terminal and a second contact terminal each configured to extend within the port structure, wherein the first contact terminal is configured to be electrically coupled to the first electrical connector and the second contact terminal is configured to be electrically coupled to the second electrical connector.

8. The charging assembly kit of claim 7, further comprising a first terminal body configured to be received within the first passageway and a second terminal body configured to be received within the second passageway.

9. The charging assembly kit of claim 8, wherein each of the first terminal body and the second terminal body include a sidewall defining a hollow chamber, with a first aperture extending through the sidewall of the first terminal body and a second aperture extending through the sidewall of the second terminal body.

10. The charging assembly kit of claim 9, wherein the first aperture is configured to be in fluid communication with a first end of the channel extending through the mounting body when the first terminal connector is received within the first passageway and the second aperture is configured to be in fluid communication with a second end of the channel extending through the mounting body when the second terminal connector is received within the second passageway.

11. The charging assembly kit of claim 10, wherein the channel of the first electrical connector is configured to be in fluid communication with the channel of the second electrical connector when a first end of the first electrical connector is attached to the first terminal body and a first end of the second electrical connector is attached to the second terminal body.

12. The charging assembly kit of claim 11, wherein a second end of the first electrical connector and a second end of the second electrical connector are each configured to be fluidly coupled to a coolant source.

13. The charging assembly kit of claim 12, wherein the second ends of each of the first electrical connector and second electrical connector are configured to be electrically coupled to the battery of a vehicle.

14. The charging assembly kit of claim 8, wherein the first terminal connector electrically couples the first contact terminal to the first electrical connector and the second terminal connector electrically couples the second contact terminal to the second electrical connector.

15. The charging assembly kit of claim 14, further comprising a sealing body having a first receiving structure configured to receive the first electrical connector, a second receiving structure configured to receive the second electrical connector, and a body portion configured to surround and attached to at least a portion of an exterior surface of the mounting body.

16. A method comprising:
providing a charging housing, the housing comprising:
a first opening and a second opening; and
a port extending about each of the first and second openings and outwards from a rear surface of a mounting plate, the port including a mounting body comprising:
a first passageway defined by and extending through the mounting body from a rear portion of the mounting body, wherein the first passageway is in fluid communication with the first opening, and wherein a pump transfers coolant through the first passageway to a battery; and
a second passageway defined by and extending through the mounting body from the rear portion of the mounting body, wherein the second passageway is in fluid communication with the second opening, and wherein the pump transfers coolant through the second passageway to the battery;
arranging a portion of a first energy transfer assembly within the charging port of the housing;
arranging a portion of a second energy transfer assembly within the charging port of the housing; and
electrically coupling the first energy transfer assembly and the second energy transfer assembly to the battery of the vehicle;
wherein a charging port configured to engage a charging plug of a charging station is provided on a first surface of the housing and a mounting body is provided on a second surface of the housing.

17. The method of claim 16, further comprising fluidly coupling a second portion of the first energy transfer assembly and a second portion of the second energy transfer assembly to a coolant source;
wherein fluidly coupling the second portion of the first energy transfer assembly to a coolant source comprises fluidly coupling a coolant source of the vehicle to a first channel extending through at least a portion of the first energy transfer assembly and fluidly coupling the second portion of the second energy transfer assembly to a coolant source comprises fluidly coupling the coolant source of the vehicle to a second channel extending through at least a portion of the second energy transfer assembly.

18. The method of claim 17, further comprising fluidly coupling the first channel of the first energy transfer assembly and the second channel of the second energy transfer assembly to define a return fluid path.

19. The method of claim 18, wherein fluidly coupling the first channel of the first energy transfer assembly and the second channel of the second energy transfer assembly includes coupling the first channel of the first energy transfer assembly to a first end of a fluid channel defined by and extending through the mounting body and coupling the second channel of the second energy transfer assembly to a second end of the fluid channel of the mounting body.

20. The method of claim 18, further comprising providing a voltage isolation between the first energy transfer assembly and the second energy transfer assembly.

\* \* \* \* \*